United States Patent [19]

Yoshida

[11] Patent Number: 5,748,333
[45] Date of Patent: May 5, 1998

[54] IMAGE COMMUNICATION APPARATUS HAVING THE FUNCTION OF ECM (ERROR CORRECTION MODE COMMUNICATION)

[75] Inventor: Takehiro Yoshida, Tokyo, Japan

[73] Assignee: Canon Kabushiki Kaisha, Tokyo, Japan

[21] Appl. No.: 688,223

[22] Filed: Jul. 29, 1996

Related U.S. Application Data

[63] Continuation of Ser. No. 370,353, Jan. 9, 1995, abandoned, which is a continuation of Ser. No. 150,825, Nov. 12, 1993, abandoned.

[30] Foreign Application Priority Data

Dec. 11, 1992 [JP] Japan ................................. 4-331976

[51] Int. Cl.[6] .............................. H04N 1/40; H04N 1/00
[52] U.S. Cl. ........................ 358/445; 358/405; 358/434
[58] Field of Search ................................ 358/405, 406, 358/434, 435, 436, 437, 438, 439, 445; 371/30, 32

[56] References Cited

U.S. PATENT DOCUMENTS

| | | |
|---|---|---|
| 4,829,524 | 5/1989 | Yoshida ........................... 371/32 |
| 5,031,179 | 7/1991 | Yoshida et al. .................. 371/32 |
| 5,057,938 | 10/1991 | Edamura ......................... 358/406 |
| 5,127,013 | 6/1992 | Yoshida ........................... 371/32 |
| 5,172,246 | 12/1992 | Yoshida .......................... 358/406 |
| 5,220,439 | 6/1993 | Yoshida .......................... 358/404 |

FOREIGN PATENT DOCUMENTS

| | | |
|---|---|---|
| 0480744 | 4/1992 | European Pat. Off. . |
| 60-112370 | 6/1985 | Japan ............................ 358/404 |

OTHER PUBLICATIONS

Pat. Abs. Jp., vol. 7, No. 58 (E-163) Mar. 10, 1983 (JP-A-57203373).

*Primary Examiner*—Thomas D. Lee
*Attorney, Agent, or Firm*—Fitzpatrick Cella Harper & Scinto

[57] ABSTRACT

An image communication apparatus and a method therefor are operable in an error correction communication mode so as to reduce the usage of a data bus. The apparatus receives image data and outputs it in byte units, and includes an image memory for storing at least one page of image data. The apparatus further includes a controller for inputting the image data from the receiver and for directly storing the input image data into the image memory without using a buffer memory.

19 Claims, 12 Drawing Sheets

IMAGE COMMUNICATION APPARATUS HAVING THE FUNCTION OF ECM (ERROR CORRECTION MODE COMMUNICATION)

This application is a continuation of application Ser. No. 08/370,353 filed on Jan. 9, 1995, which is a continuation of prior application Ser. No. 08/150,825 filed on Nov. 12, 1993 now abandoned.

BACKGROUND OF THE INVENTION

1. Field of the Invention

The present invention relates to an image communication apparatus having the function of ECM communication.

2. Related Background Art

One type of conventional facsimile apparatus receives image data in ECM communication as follows.

FIG. 12 is a block diagram of the conventional facsimile apparatus.

In FIG. 12, numeral 50 is a modem, and numerals 52 and 54 are temporary buffer memories into which frame data is momentarily stored. For example, a capacity of each temporary buffer memory is 512 bytes. Numeral 56 is an image memory into which received data is stored in units of a block or page.

The conventional facsimile apparatus stores a frame of demodulated data into the temporary buffer memory 52 in accordance with an interrupt from the modem 50. After having received a frame of demodulated data, the apparatus stores a next frame of demodulated data into the temporary buffer memory 54. After that, received frame data is stored into the temporary buffer memory 52 and 54 alternately.

In a case where the received data has been stored into the temporary buffer memory 52, the apparatus checks the CRC. If no error is detected in checking the CRC, the apparatus checks the frame number, and then stores coded data included in the frame data into a memory area of the image memory 56 corresponding to the frame number. After that, when the next frame data has been stored in the temporary buffer memory 54, the apparatus checks the CRC. If no error is detected in checking the CRC, the apparatus checks the frame number, and then stores coded data included in the frame data into a memory area of the image memory 56 corresponding to the frame number. After that, the apparatus stores received frame data into the temporary buffer memories 52 and 54 alternately. If no error is detected in checking the CRC, the apparatus checks a frame number of stored data, and then stores coded data into the image memory 56.

When a block of data or a page of data has been stored into the image memory 56, the apparatus starts a recording operation of the image data stored in the image memory 56.

In the processes mentioned above, the data transfer is performed in byte units by means of using a data bus. The apparatus uses the data bus four times for storing the received data into the image memory 56. The first time is when the data is inputted from the modem 50 to an accumulator of a microprocessor. The second time is when the data is outputted from the accumulator to the temporary buffer memory. The third time is when the data is inputted from the temporary buffer memory to the accumulator. The fourth time is when the data is outputted from the accumulator to the image memory 56.

Therefore, the apparatus has a problem which is to spend a long time to store the received data into the image memory 56. Especially, when image reception is performed at a high speed (e.g. 14.4K bps), or when dual operations (e.g. image reception and copy operation) are performed in parallel, the received data must be quickly stored into the image memory.

SUMMARY OF THE INVENTION

In consideration of the foregoing, an object of the present invention is to provide an improvement in this type of image communication apparatus.

Another object of the present invention is to provide an image communication apparatus capable of storing received image data into an image memory at a high speed.

Another object of the present invention is to provide an image communication apparatus capable of directly storing image data received in an error correction communication mode into an image memory without using a temporary buffer memory.

These and others objects are accomplished by providing an image communication apparatus comprising means for receiving image data and for outputting received image data in byte units, and control means for inputting the image data from said receiving means in byte units and for directly storing the input image data into an image memory capable of storing at least one page of image data without using a buffer memory.

Still other objects of the present invention, and the advantages thereof, will become fully apparent from the following description of the preferred embodiment to be taken in conjunction with the attached drawings.

DETAILED DESCRIPTION OF THE PREFERRED EMBODIMENT

Now the present invention will be clarified in detail by an embodiment thereof shown in the attached drawings.

In an ECM image reception according to this embodiment, received frame data from a modem is directly stored into an image memory without using a temporary buffer memory. When a facsimile apparatus according to this embodiment stores the received frame data into the image memory, the facsimile apparatus detects whether the received frame data has an error or not. If the received frame data has an error, the facsimile apparatus does not store the frame data into the image memory.

In a case where flags, address data, control data or data of a facsimile control field in a frame data is not correct, the facsimile apparatus doe not store the frame data into the image memory.

In a case where data corresponding to a received frame number has already been stored into the image memory, the facsimile apparatus does not store the received frame data into the image memory.

In a case where a quantity of code data of one frame is over a predetermined value while the facsimile apparatus is storing code data of the frame into the image memory, the facsimile apparatus stops the storing operation of the frame data and shifts to receiving of a next frame.

In receiving initial image data and retransmitted image data, the facsimile apparatus performs the above mentioned processes. Thereby, received data is stored into the image memory using a bus twice, and is stored at a high speed.

Figure 1:
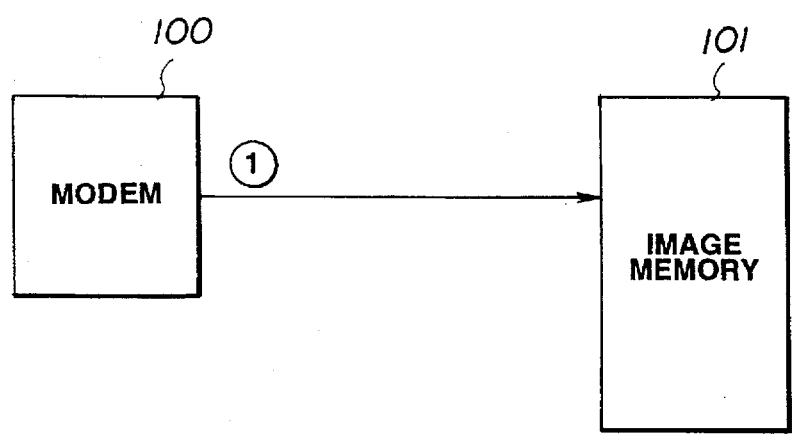
FIG. 1 is a block diagram showing a connecting condition between a modem and an image memory.

FIG. 1 is a block diagram showing the connection between a modem 100 and an image memory 101.

A control circuit 28 (a microprocessor—see FIG. 2) inputs demodulated data from the modem 100 in response to an interrupt request from the modem 100. The control circuit 28 checks a frame number, address data (A), control data (C), and a facsimile control field (FCF).

In a case where A, C and FCF have been normally received, and where data corresponding to the recognized frame number has not been stored in the image memory 101, the control circuit 28 stores code data of the received frame data into a memory area of the image memory 101 corresponding to the recognized frame number. Then, in a case where a quantity of code data stored in the image memory 101 exceeds a predetermined value, the control circuit 28 does not store the remaining frame data to be received after that, and waits for receiving a next frame data. Thereby, in the ECM reception, the facsimile apparatus does not need a temporary buffer memory into which frame data is temporarily stored, and the received data is stored into the image memory using the bus twice.

Figure 2:
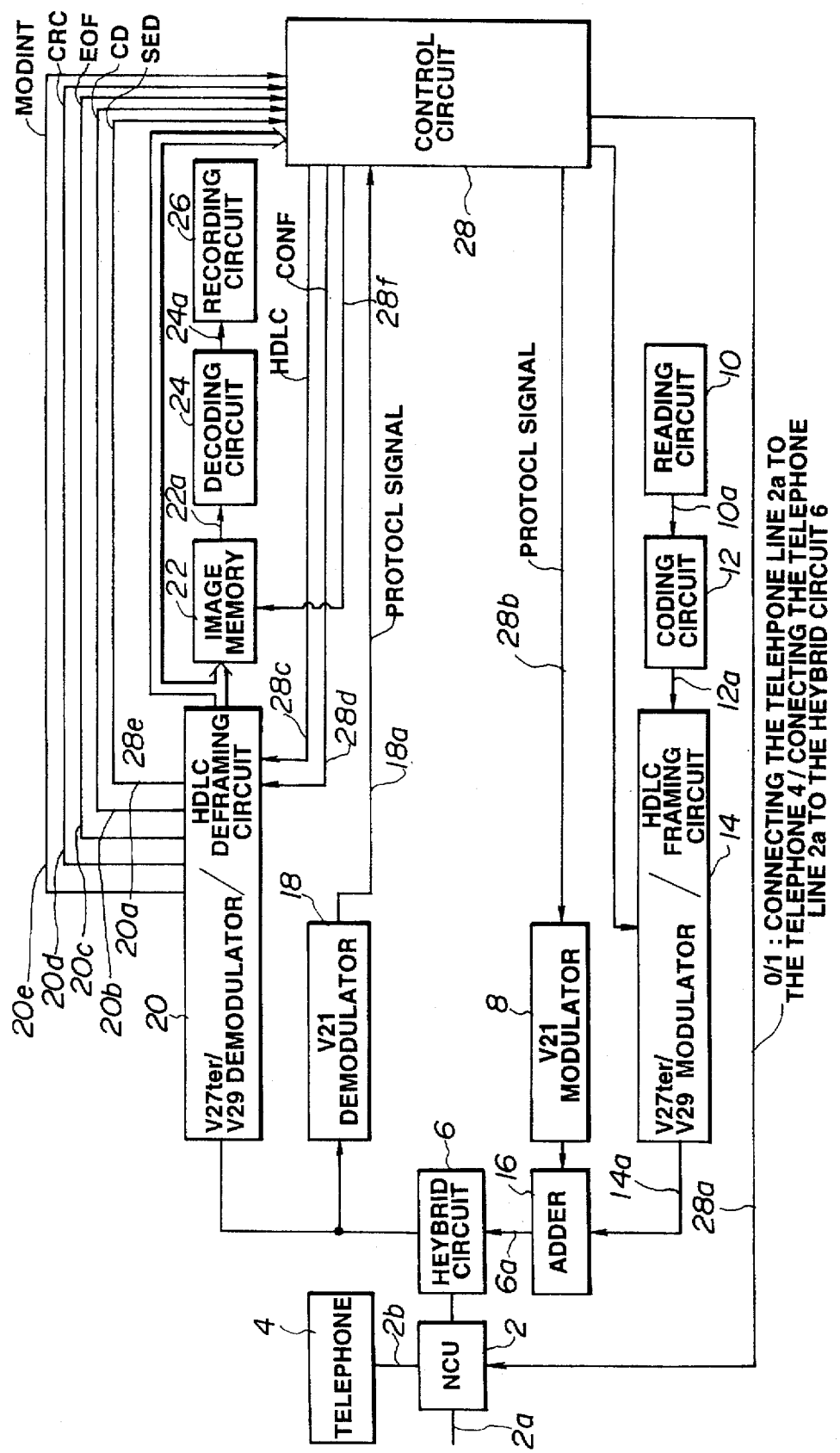
FIG. 2 is a block diagram of a facsimile apparatus according to an embodiment of the present invention.

FIG. 2 is a block diagram of the facsimile apparatus, according to the present invention.

In FIG. 2, an NCU (Network Control Unit) is provided for connecting to and using a telephone network for data and other communication. The NCU 2 has a relay CML (unshown) for making connections. The NCU 2 connects a telephone line 2a to the facsimile terminal, controls connections between the telephone line 2a and a telephone 4 or a hybrid circuit 6 and maintains a closed loop. In particular, the NCU 2 connects the telephone line 2a to the telephone 4 when the signal level of a signal line 28a from the control circuit 28 is "0". On the other hand, when the signal level of the signal line 28a is "1", the NCU 2 connects the telephone line 2a to the facsimile terminal, which is constituted by all the elements in FIG. 2 except the NCU 2 and the telephone 4. In a normal condition or initial condition, the telephone line 2b is connected to the telephone 4.

A hybrid circuit 6 is provided for separating the transmitted signals and received signals. In other words, the hybrid circuit 6 sends the transmitted signal from an adder 16 to the telephone line 2a via the NCU 2, and transfers the received signal from another station via the NCU 2 to a demodulator 18 and a demodulator 20.

A modulator 8 is provided for modulating protocol signals from the control circuit 28. The modulator 8 modulates signals based on the V21 recommendation of CCITT.

A reading unit 10 is provided for reading image information of an original document line by line of main scanning, and for outputting signals having two values: white and black. The reading unit 10 is structured with an imaging device such as a CCD (Charge Coupled Device), an optical system and so on. The reading unit 10 also has a sensor for detecting a next original sheet to be sent, and provides information whether the next original sheet is present or not to the control circuit 28.

A coding circuit 12 is also provided for coding information read by the reading unit 10. The MH coding method, the MR coding method and the MMR coding method are advantageously used by the coding circuit 12.

A modulator 14 is provided for modulating image data based on the V27 ter (differential phase modulation) or V29 (orthogonal modulation) recommendation of CCITT. The modulator 14 inputs the image data from the coding unit 12 in accordance with a control signal from the control circuit 28. In ECM transmission, the modulator 14 frames code data from the coding circuit 12 in accordance with the HDLC format, modulates it, and outputs the modulated data to the adder 16.

The adder 16 is provided for adding outputs of the modulators 8 and 14.

The demodulator 18 is provided for demodulating protocol signals based on the V21 recommendation of CCITT.

The demodulator 20 is provided for demodulating a received data signal based on the recommendation V27 ter or V29 of CCITT. The demodulator 20 deframes the demodulated data signal of the HDLC format. The demodulator 20 sets its mode in accordance with control signals 28c (HDLC) and 28d (CONF) from the control circuit 28. When the control signal 28c is "1" (High level), the demodulator 20 effects a function of the HDLC deframing so as to perform a demodulating operation and a HDLC deframing operation. At that time, output signals 20a, 20b, 20c, 20d, and 20e are valid. On the other hand, when the control signal 28c is "0" (Low level), the demodulator 20 does not effect the HDLC deframing function so as to perform only the demodulating operation. At that time, output signals 20a, 20b, and 20e are valid.

The demodulator 20 sets a transmitting speed etc. in accordance with the control signal 28d (CONF). When the demodulator 20 detects some energy (e.g. more than —43 dBm) on the telephone line 2a, the demodulator 20 sets the signal 20a (SED) to be "1". When the demodulator 20 does not detect any energy (e.g. not more than —43 dBm) on the telephone line 2a, the demodulator 20 sets the signal 20a (SEB) to be "0".

When the demodulator 20 detects a unique signal (e.g. data in a high speed receiving mode), the demodulator 20 sets the signal 20b to be "1". When the demodulator 20 does not detect any unique signal, the demodulator 20 sets the signal 20b to be "0". When the demodulator 20 finishes receiving one frame and detects a closed flag, the demodulator 20 sets the signal 20c (EOF) to be "1". When the control circuit 28 inputs one byte of received data via a data bus 28e, the demodulator 20 sets the signal 20c to be "0". When the demodulator 20 detects an EOF (End of Frame) and sets the signal 20c to be "1", the demodulator 20 outputs a result of the CRC checking as the signal 20d. When the result of the CRC checking is an error, the demodulator 20 sets the signal 20d to be "1". When the result of the CRC checking is not an error, the demodulator 20 sets the signal 20d to be "0". When the demodulator 20 receives one byte of data, the demodulator 20 sets the signal 20e to be "1". When the demodulator 20 inputs status information, the demodulator 20 sets the signal 20e to be "0".

An image memory 22 corresponds to the image memory 101 of FIG. 1 and is provided for storing image data. The image memory 22 stores data output in byte units from the control circuit 28, and outputs data stored in the image memory 22 as byte data to a decoding circuit 24, in accordance with a control signal 28f from the control circuit 28.

The decoding circuit 24 is provided for parallel-serial converting byte data from the image memory 22 and decoding (MH decoding, MR decoding or MMR decoding) the converted data.

A recording unit 26 is provided for recording decoded image data from the decoding unit 24 on a recording material sequentially and line by line.

The control circuit 28 is provided for controlling all circuits mentioned above and the total system for this facsimile apparatus, and is structured with a CPU, memories, and other conventional elements.

FIG. 3 through FIG. 8 together form a flow chart showing a control operation of the control circuit 28.

Figure 8:
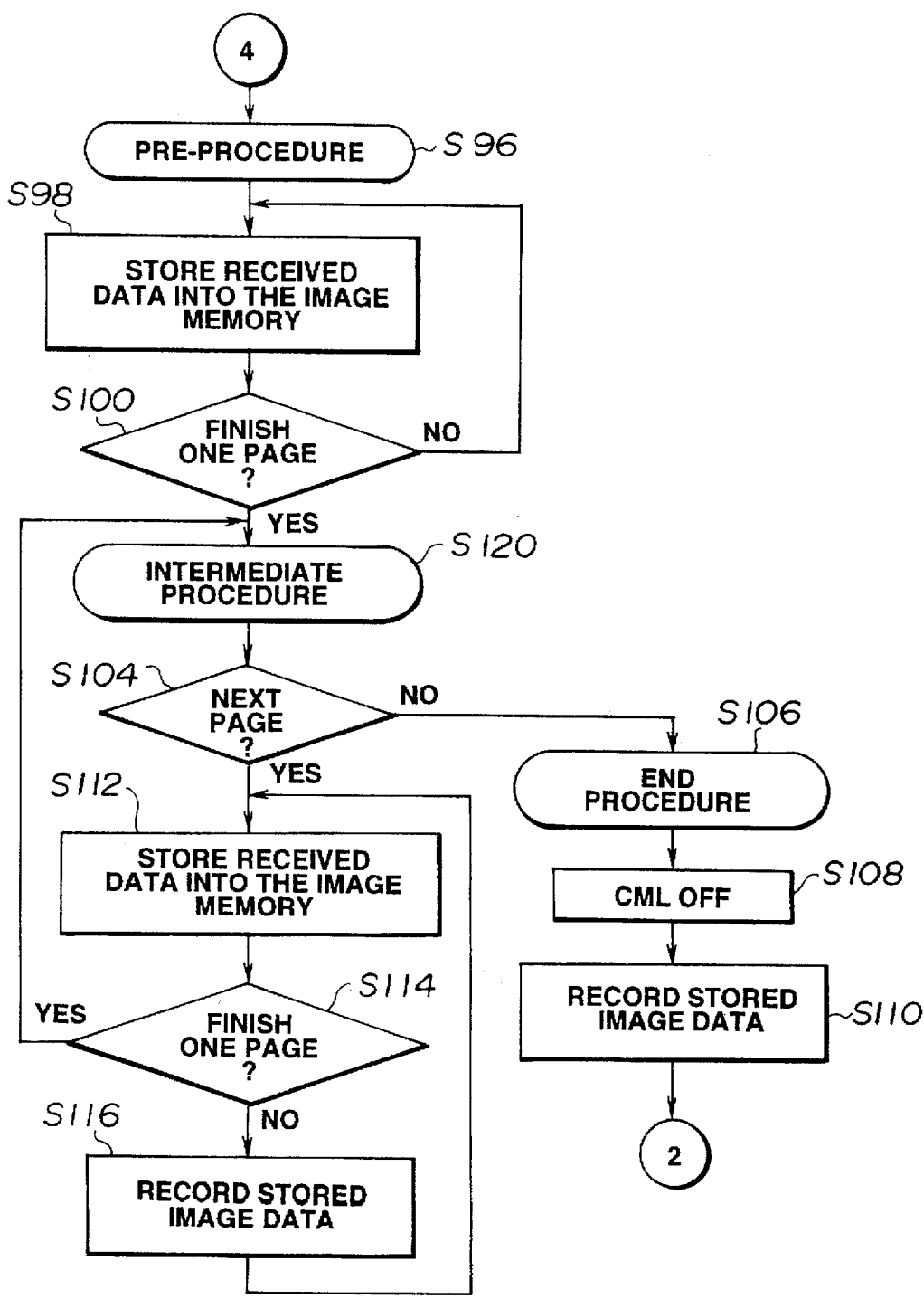

At the start of the operation (S30), the control circuit 28 initializes the relay CML of the NCU 2 to connect the telephone line 2a to the telephone 4 by setting the signal line 28a to be "0" (S32). The control circuit 36 discriminates whether image reception has been selected or not (S34). If image reception has not been selected the control circuit 28 performs other processes (S36), and then returns to step S34. If image reception has been selected, the control circuit 28 turns on the relay CML of the NCU 2 by setting the signal line 28a to be "1" so as to connect the telephone line 2a to the facsimile terminal (S38). Then the control circuit 28 performs a pre-procedure for setting a communication mode (S40), and discriminates whether ECM (Error Correction Mode) image reception has been selected or not in the pre-procedure (S42). If ECM image reception has not been selected, the control circuit 28 shifts from step S42 to step S96 (FIG. 8). If ECM image reception has been selected, the control circuit 28 completes the pre-procedure (S44), sets the signal 28c to be "1" so as to set a HDLC reception mode (S46 of FIG. 4), and sets a transmission speed (S48). The control circuit 28 enables an interrupt routine ECMR-INT (FIG. 9–FIG. 11) so that the interrupt routine ECMI-INT is performed when a level of the signal MODINT (an interrupt request from the demodulator 20) becomes "1" (S50). The control circuit 28 sets flags CORECTFLM to be "1"s (S52). The flags CORECTFLM indicate whether each of 256 frames are correctly received or not, and have a memory read of 32 bytes. When a frame is correctly received, the control circuit 28 sets a flag (one of flags CORECTFLM) corresponding to that frame to be "0".

Next, the control circuit 28 stores a start address STA-TART of the image memory 22 into a pointer MEMSTAPTR (S54), clears a flag RCPDET which indicates whether a RCP has been detected or not (S56), clears a flag ERRORFLM which indicates whether a receiving frame has an error or not (S58), and clears a pointer FLMPTR for receiving a frame (S60). Then the control circuit 28 stores received data into the image memory 22 by performing the interrupted routine ECMR-INT in response to an interrupt request from the demodulator 20 until the RCP is received (S62, S64). In step S64, the control circuit 28 discriminates whether the flag RCPDET is "0" or not. When the RCP has not been detected, the flag RCPDET is "0", and when the RCP has been detected, the flag RCPDET is "1".

The control circuit 28 performs an intermediate procedure (S66), and discriminates whether a next page of image data will be received or not on the basis of information received in the intermediate procedure (S68). If a next page will not be received, the control circuit 28 performs an end procedure (S70), turns off the relay CML (S72), reads a previous page of data from the image memory 22, supplies the read data to the decoding unit 24, causes the recording unit 26 to record the previous page of data on the recording material at a fixed speed (S74) and then returns to step S34. On the other hand, if a next page will be received, the control circuit 28 sets a transmission speed (S76), enables the interrupt routine ECMR-INT as in step S50 (S78), and sets the flags CORECTFLM to be "1"s as in step S52 (S80).

Figure 6:
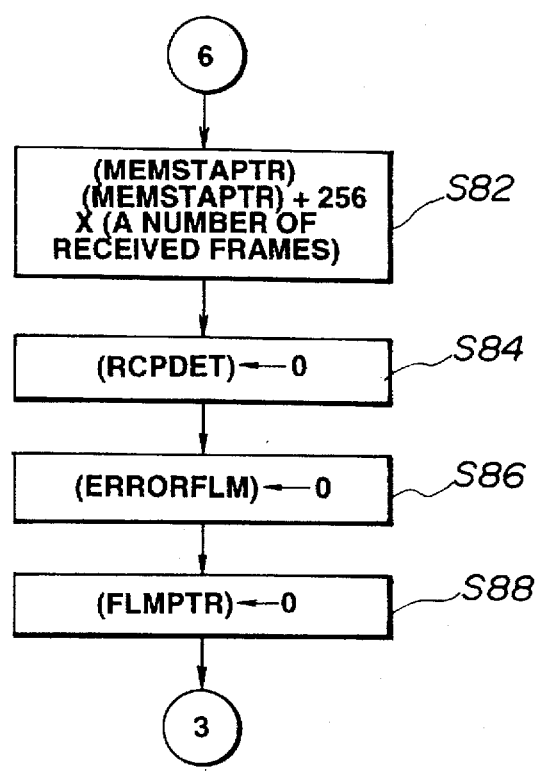
Figure 7:
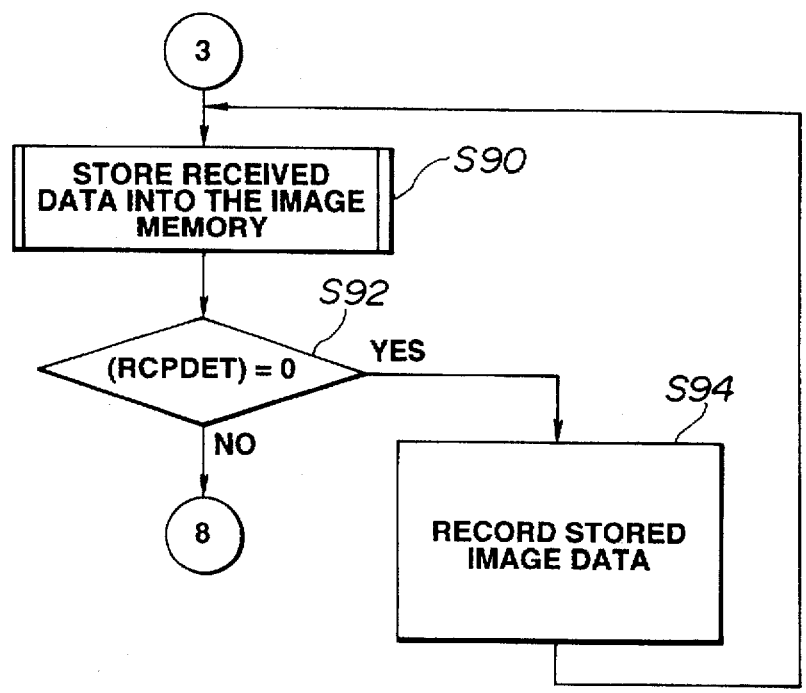

Next the control circuit 28 stores a value (MEMSTAPTR+256×a number of received frames) into the pointer MEMSTAPTR so as to store a start address, for storing the next page of data, into the pointer MEMSTAPTR (S82 of FIG. 6). The control circuit 28 clears the flag RCPDET (S84), clears the flag ERRORFLM (S86), and clears the pointer FLMPTR (S88).

Next the control circuit 28 stores the received data into the image memory 22 by performing the interrupt routine ECMR-INT in response to an interrupt request from the demodulator 20 until the RCP is received as in steps S62 and S64 (S90, S92) while the control circuit 28 causes the recording unit 26 to record the previous page of data (a partial page of data in the ECM communication) at the fixed speed as step S74 (S94).

Figure 5:
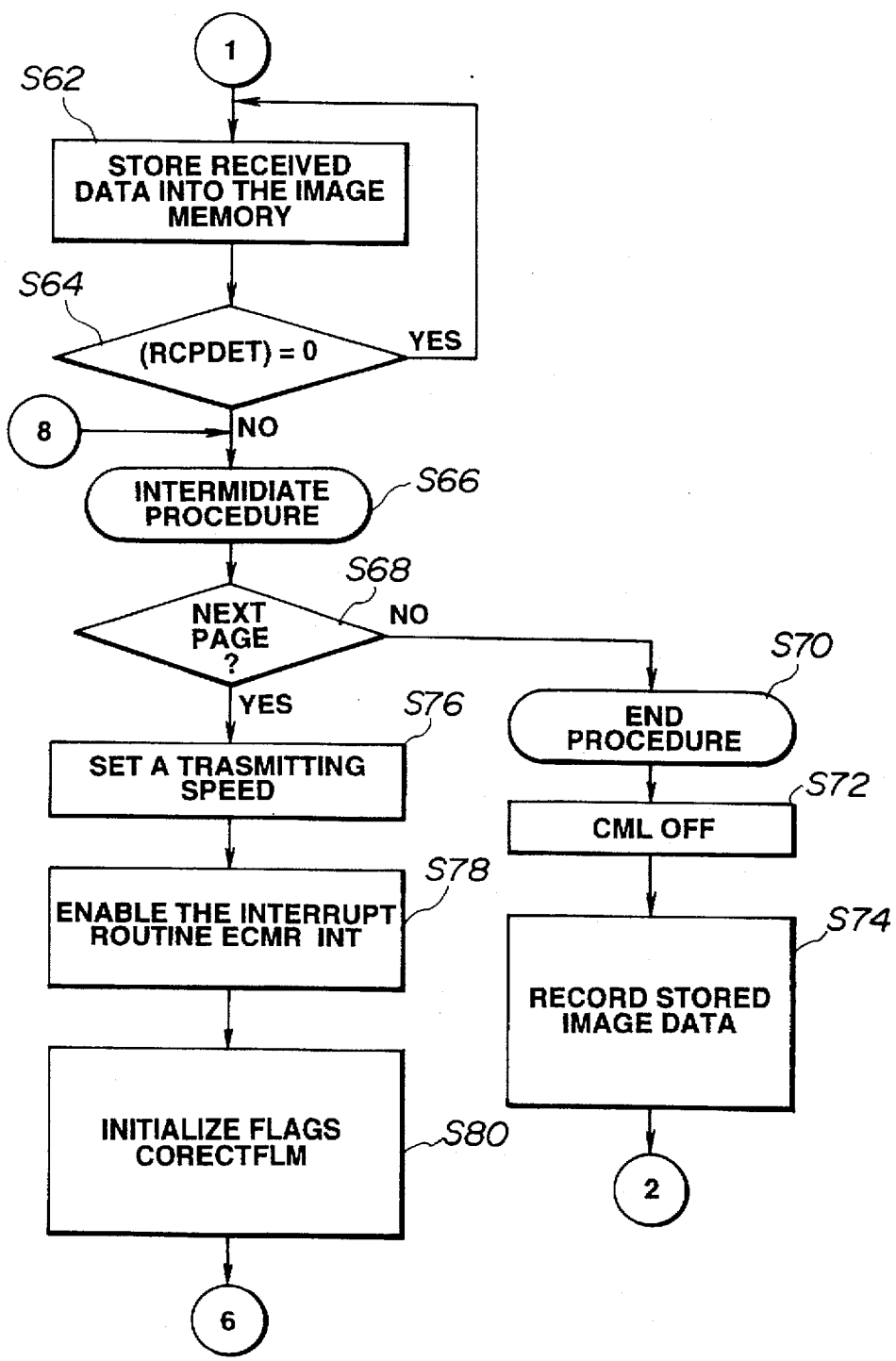

In a case where the RCP has been received, the control circuit 28 shifts from step S92 to step S66 (FIG. 5).

On the other hand, in a case where ECM image reception has not been selected in step S42 (FIG. 3), the control circuit 28 completes the pre-procedure (S96), sets the signal 28c to be "0", sets transmission speed by the signal 28d, and stores received data into the image memory 22 via the data bus 28e by the signals 20a (SED), 20b (CD), 20e (MEDINT), and 28f (S98) until the control circuit 28 detects that a page of data has been received (S100).

Figure 3:
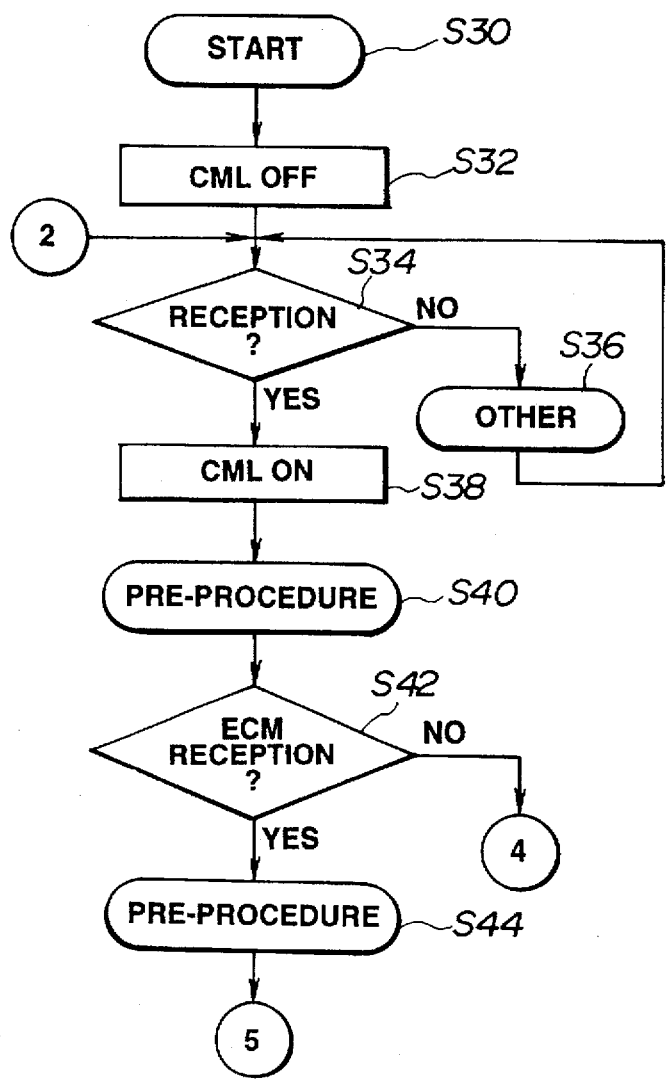
FIG. 3 through FIG. 8 together form a flow chart showing a control operation of a control circuit 28.
Figure 4:
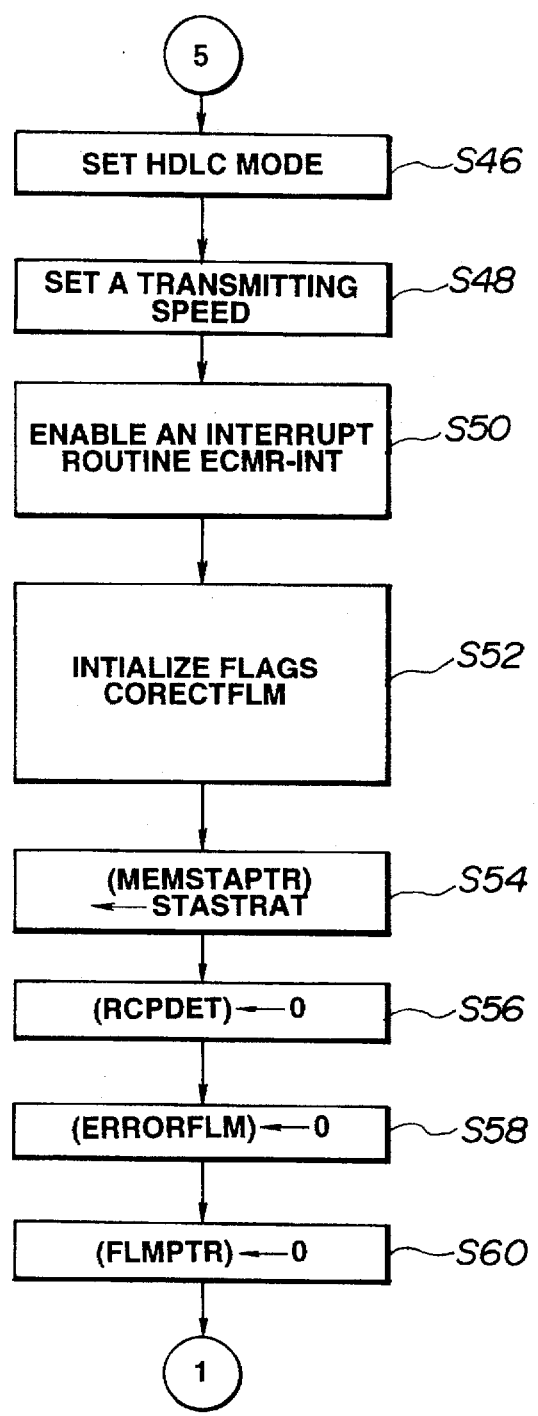

In a case where a page of data has been received, the control circuit 28 performs the intermediate procedure (S102), and discriminates whether a next page of data will be received or not (S104). If a next page of data will not be received, the control circuit 28 performs the end procedure (S106), turns off the relay CML, causes the recording unit 26 to record the data stored in the image memory 22 on a recording material (S110), and then returns to step S34 (FIG. 3). On the other hand, if a next page of data will be received, the control circuit 28 stores received data into the image memory as in step S98 (S112) and causes the recording unit 26 to record the stored data (S116) until the control circuit 28 detects that a page of data has been received (S114). In a case where a page of data has been received, the control circuit 28 shifts from step S114 to step S102.

Figure 9:
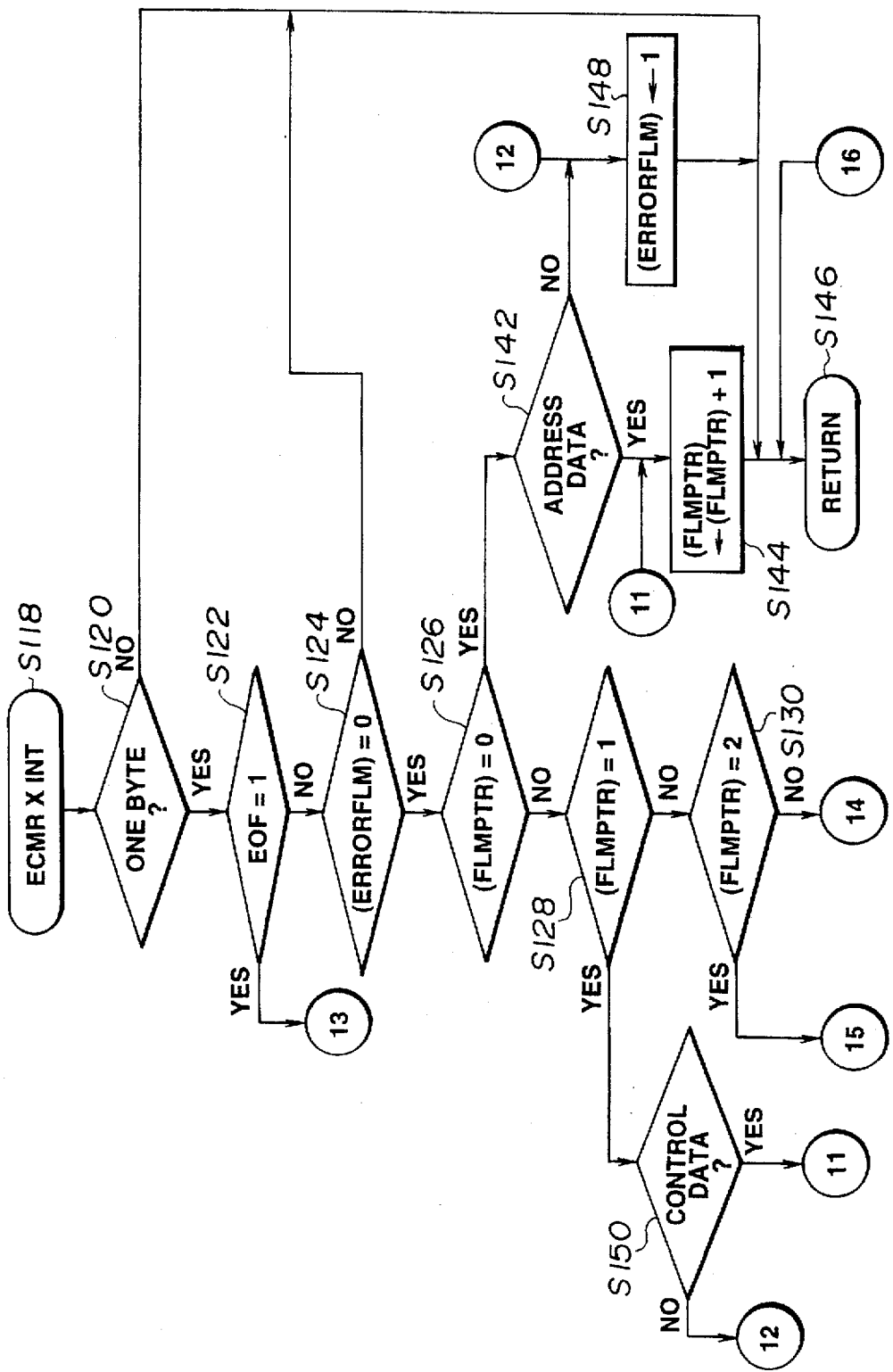
FIG. 9 through FIG. 11 together form a flow chart showing a modem interrupt routine.
Figure 10:
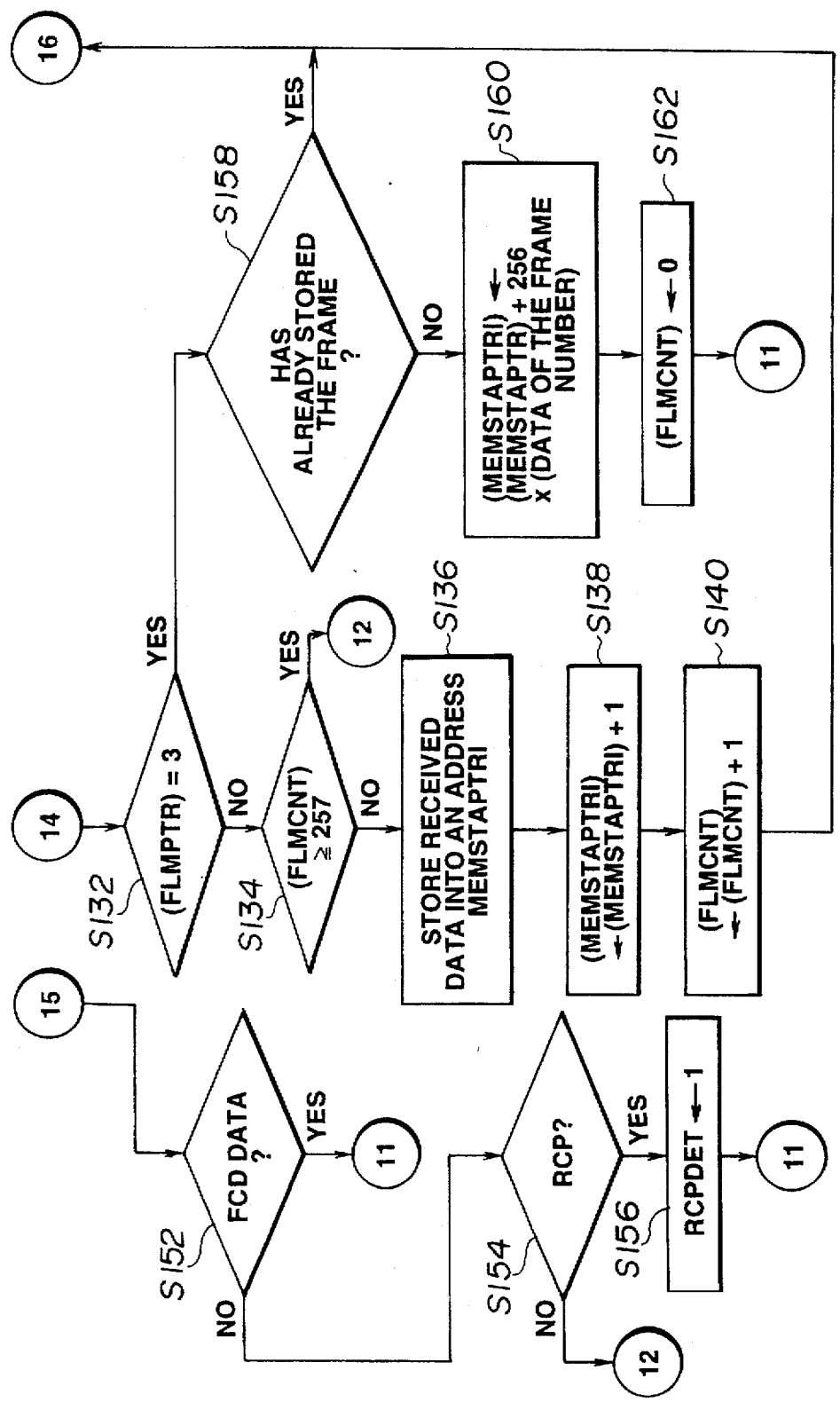
Figure 11:
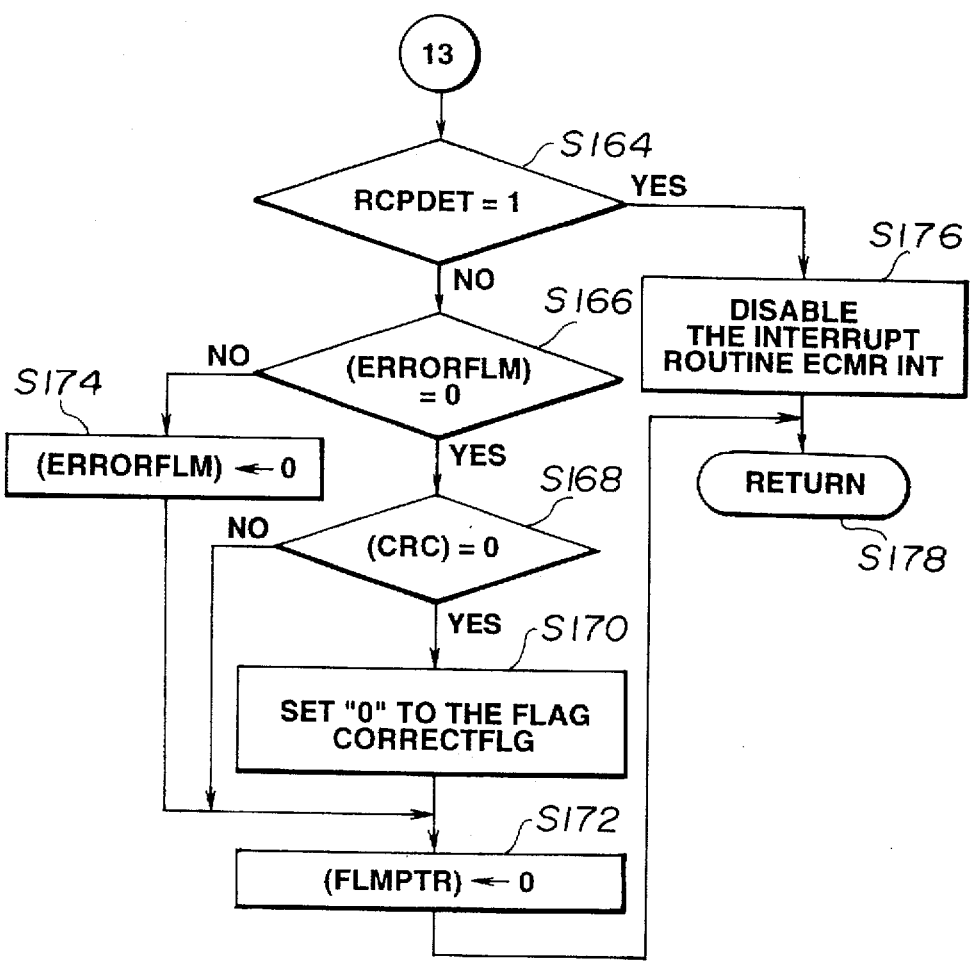
Figure 12:
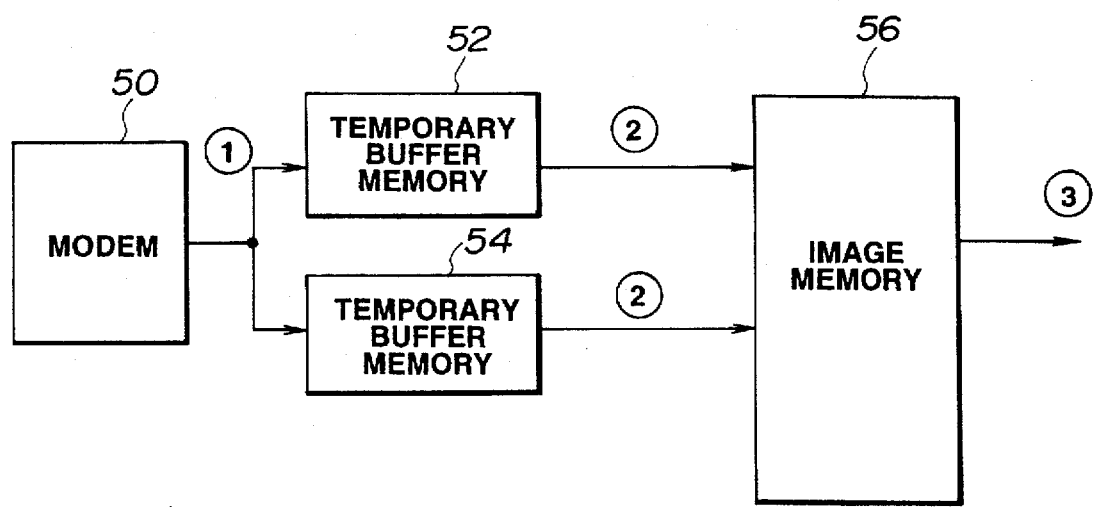
FIG. 12 is a block diagram of the conventional facsimile apparatus.

FIG. 9 through FIG. 11 together from a flow chart showing the interrupt routine ECMR-INT. The control circuit 28 performs the interrupt routine ECMI-INT instead of the main routine (FIG. 3 though FIG. 8) in response to an interrupt request from the demodulator 20.

In the interrupt routine ECMR-INT, the control circuit 28 discriminates whether a byte of data (received data or status data) is received or not (S120), and if a byte of data is not received, the control circuit 28 returns to the main routine. If a byte of data is received, the control circuit 28 discriminates whether a value of the signal EOF is "1" or not (S122). If a value of the signal EOF is "1" (an end flag of one frame is detected), the control circuit 28 shifts from step S122 to step S164 (FIG. 11). If a value of the signal EOF is not "1" (the end flag of one frame is not detected), the control circuit 28 discriminates whether a value of the flag ERRORFLM is "0" or not (S124). If the flag ERRORFS is "0" (the receiving frame does not have an error), the control circuit 28 discriminates whether a value of the pointer FLMPTR is "0" or not (S126). If the flag ERRORLM is not "0" (the receiving frame has an error), the control circuit 28 returns to the main routine.

If a value of the pointer FLMPTR is "0" in step S126, the control circuit 28 discriminates whether the received data is data of the address field or not (S142), and when the received data is data of the address field, the control circuit 28 increments the pointer FLMPTR (S144), and then returns to the main routine. When the received data is not data of the address field, the control circuit 28 sets the flag ERRORFLM to be "1" (S148), and then returns to the main routine.

If a value of the pointer FLMPTR is not "0" in step S126, the control circuit 28 discriminates whether a value of the pointer FLMPTR is "1" or not (S128), and when a value of the pointer FLMPTR is "1", the control circuit 28 discriminates whether the received data is data of the control field or not (S150). When the received data is data of the control field in step S150, the control circuit 28 shifts to step S144. On the other hand, when the received data is not data of the control field in step S150, the control circuit 28 shifts to step S148.

If a value of the pointer FLMPTR is not "1" in step S128, the control circuit 28 discriminates whether a value of the pointer FLMPTR is "2" or not (S130). When a value of the pointer FLMPTR is "2", the control circuit 28 discriminates whether the received data is data of the FCD (Facsimile Coded Data) field or not (S152 of FIG. 10). If the received data is data of the FCD field in step S152, the control circuit 28 shifts to step S144 (FIG. 9). If the received data is not data of the FCD field in step S152, the control circuit 28 discriminates whether the received data is data of the RCP (Return to Control for Partial page) field or not (S154). If the received data is data of the RCP field in step S154, the control circuit 28 sets the flag RCPDET to be "1" (S156), and then shifts to step S144 (FIG. 9). If the received data is not data of the RCP field in step S154, the control circuit 28 shifts to step S148 (FIG. 9).

If a value of the pointer FLMPTR is not "2" in step S130, the control circuit 28 discriminates whether a value of the pointer FLMPTR is "3" or not (S132 of FIG. 10). If a value of the pointer FLMPTR is "3", the control circuit 28 checks whether data corresponding to a number of the received frame has already been stored in the image memory 22 of not (S158). If the data has already been stored in step S158, the control circuit 28 returns to the main routine. If the data has not been stored in step S158 yet, the control circuit 28 stores a value, which is (a value of the pointer MEMSTAPTR)+(256 ×a frame number of data which is being received), into an address pointer MEMSTAPTRI, and memorizes the frame number of data which is being received (S160). The control circuit 28 clears a counter FLMCNT for counting a number of bytes of the frame which is being received (S162), and then shifts to step S144 (FIG. 9).

If a value of the pointer FLMPTR is not "3" in step S132, the control circuit 28 discriminates whether a value for the counter FLMCNT is more than 257 or not (S134). In other words, the control circuit 28 discriminates whether data of 257 bytes has been received or not in ECM image reception. If a value of the counter FLMCNT is more than 257, the control circuit 28 shifts to step S148 (FIG. 9). If a value of the counter FLMCNT is not more than 257, the control circuit 28 stores the byte of received data into an address indicated by the address pointer MEMSTAPTRI (S136), increments the address pointer MEMSTAPTRI (S138), increments the counter FLMCNT (S140), and then returns to the main routine.

If a value of the signal EOF is "1" in step S122 (FIG. 9), the control circuit 28 discriminates whether a value of the flag RCPDET is "1" or not (S164 of FIG. 11). If a value of the flag RCPDET is "1", the control circuit 28 disables the interrupt routine ECMR-INT (S176), and then returns to the main routine. If a value of the flag RCPDET is not "1", the control circuit 28 discriminates whether a value of the flag ERRORFLM is "0" or not (S166). If a value of the flag ERRORFLM is not "0", the control circuit 28 clears the ERRORFLM (S174), and then shifts to step S172. If a value of the flag ERRORFLM is "0", the control circuit 28 inputs the signal 20d (a result of checking the CRC), and discriminates whether a value of the signal 20d is "0" or not (S168). If a value of the signal 20d is "0" (there is no error of CRC), the control circuit 28 sets one of the flags CORECTFLG corresponding to the received frame number to be "0" (S170), clears the pointer FLMPTR (S172), and then returns to the main routine. If a value of the signal 20d is not "0" in step S168, the control circuit 28 shifts from step S168 to step S172. In a case where data of an error frame is retransmitted, the control circuit 28 stores the retransmitted frame data into an area of the image memory 22 corresponding to the retransmitted frame number in frame units.

In the facsimile apparatus mentioned above, a frame of data is 256 bytes. However, a frame of data might be 64 bytes or any number of bytes.

Further, the facsimile apparatus might be modified so as to perform ECM image reception and a local operation (e.g. copy operation, a storing operation of image data to be transmitted) in parallel.

In the facsimile apparatus mentioned above, when the facsimile apparatus does not detect the RCP, the facsimile apparatus does not shift from the image data reception mode to the protocol signal reception mode. However, the facsimile apparatus might be modified so as to shift from the image reception mode to the protocol signal reception mode in accordance with whether a signal or a carrier is not detected for a predetermined time.

In the facsimile apparatus mentioned above, the control circuit 28 counts a number of stored bytes in a frame, and discriminates, on the basis of the number of stored bytes, whether that frame has an error or not. However, the control circuit 28 might be modified so as to discriminate, on the basis of a time elapsed from receiving a first byte of one frame, whether the frame has an error or not. For example, in a case where a transmitting speed is 9,600 bps, and where a quantity of a frame is 260 bytes (256 (Facsimile information)+4(A, C, FCF, and frame number)), the control circuit 28 discriminates whether a time elapsed from receiving a first byte of the frame is less than 0.43 seconds ((260)×8/9600×2). If the time is over 0.43 seconds, the control circuit 28 detects that the frame has an error. The standard time (e.g. 0.43 seconds) will be changed by a transmitting speed and a quantity of a frame.

Further, the facsimile apparatus according to the present invention might be structured as plural devices or as one apparatus.

Further, the present invention is applicable to a system or an apparatus to which a program for controlling is supplied.

Although one particular embodiment of the present invention is herein disclosed for purposes of explanation, various modification thereof, after study of this specification, will be apparent to those skilled in the art to which the invention pertains.

What is claimed is:

1. An image communication apparatus operable in an error correction communication mode, comprising:

means for receiving image data, and for outputting received image data in byte units;

an image memory for storing at least one page of image data;

control means for inputting the image data from said receiving means, and for storing the input image data into said image memory; and a bus connecting said receiving means, said image memory and said control means, wherein received image data is passed from said receiving means to said storage means in an operation wherein each byte unit of the received image data passes over said bus twice.

2. An image communication apparatus according to claim 1, wherein said receiving means demodulates the received image data.

3. An image communication apparatus according to claim 1, wherein said receiving means receives frames of data of HDLC format, and wherein said control means detects whether an error exists for each frame, a frame of data not having an error being a correct frame of data.

4. An image communication apparatus according to claim 3, wherein said control means stores only correct frames of data into said image memory.

5. An image communication apparatus according to claim 4, wherein said image memory has a memory area corresponding to each frame of data, and wherein said control means stores a correct frame of data into its corresponding memory area.

6. An image communication apparatus according to claim 3, wherein said frames of data each include flags, address data, control data, and data of a facsimile control field, and wherein said control means discriminates that a received frame of data is correct when said control means has detected each data of the frame in a predetermined order.

7. An image communication apparatus according to claim 3, wherein said control means stores image data included in the frame of data into said image memory.

8. An image communication apparatus according to claim 3, wherein each frame of data has a frame number and said control means begins to store a received frame of data into said image memory when data corresponding to the frame number of the received frame has not yet been stored in said image memory.

9. An image communication apparatus according to claim 3, when said control means stops storing the frame of data into said image memory when a quantity of data of the frame already stored in said image memory reaches a predetermined value.

10. An image communication apparatus operable in an error correction communication mode, comprising:

demodulating means for demodulating a received signal, and for outputting the demodulated signal as received data in byte units;

an image memory for storing at least one page of image data;

control means for inputting the received data from said demodulating means in byte units, for checking whether the input received data is a frame of data or not and, if it is, whether the frame of data has an error not, and for storing image data included in a correct frame of data not having an error into said image memory in byte units; and a bus connecting said demodulating means, said image memory and said control means, wherein the image data included in a correct frame of data not having an error is passed from said demodulating means to said image memory in an operation wherein each byte unit of the received image data passes over said bus twice.

11. An image communication apparatus according to claim 10, wherein each frame of data has a frame number, said image memory has a memory area corresponding to each frame number, and wherein said control means stores image data of a frame into a memory area having a corresponding frame number.

12. An image communication apparatus according to claim 11, wherein said control means begins to store image data of a frame of data into said image memory when image data corresponding to the frame number of the frame has not yet been stored in said image memory.

13. An image communication apparatus according to claim 10, wherein each frame of data includes flags, address data, control data, and data of a facsimile control field and wherein said control means discriminates that a received frame of data is correct when said control means has detected each data of the frame in a predetermined order.

14. An image communication apparatus according to claim 10, wherein said control means stops storing image data of the frame of data when a quantity of image data of the frame of data already stored in said image memory reaches a predetermined value.

15. An image reception method in an error correction communication mode, comprising the steps of:

receiving data and outputting the received data in byte units;

checking whether or not the received data is a frame of data including image data, and storing the image data included in the frame into an image memory capable of storing at least one page of image data in byte units, wherein the received image data included in the frame is passed, from said receiving step through said storing step, over a bus in an operation wherein each byte unit of the received image data passes over the bus twice.

16. An image reception method according to claim 15, wherein said checking step further checks whether the received frame has an error or not, and wherein said storing step stores only image data of a correct frame not having an error into the image memory.

17. An image reception method according to claim 16, wherein said frame of data includes flags, address data, control data, and data of a facsimile control field, and wherein said checking step discriminates the received frame of data to be correct when each data of the frame of data has been detected in a predetermined order.

18. An image reception method according to claim 15, wherein each frame has a corresponding frame number, further comprising the step of detecting whether image data corresponding to a received frame number has already been stored or not in said image memory, and wherein said storing step begins to store image data of the frame of data into said image memory when image data corresponding to the received frame number has not yet been stored.

19. An image reception method according to claim 15, further comprising the step of discriminating whether a quantity of the image data of the frame of data already stored in said image memory has reached a predetermined value, and wherein said storing step stops storing the image data of the frame of data when the quantity reaches the predetermined value.

* * * * *

UNITED STATES PATENT AND TRADEMARK OFFICE
CERTIFICATE OF CORRECTION

PATENT NO. : 5,748,333

DATED : May 5, 1998

INVENTOR(S): TAKEHIRO YOSHIDA

It is certified that error appears in the above-identified patent and that said Letters Patent is hereby corrected as shown below:

ON THE COVER PAGE AT ITEM [56]

"Attorney, Agent, or Firm—Fitzpatrick Cella Harper & Scinto" should read --Attorney, Agent, or Firm—Fitzpatrick, Cella, Harper & Scinto--.

COLUMN 6

Line 57, "ERRORFS" should read --ERRORFLM--;
Line 60, "ERRORLM" should read --ERRORFLM--.

COLUMN 7

Line 36, "of" should read --or--.

Signed and Sealed this

Twelfth Day of January, 1999

Attest:

Attesting Officer

*Acting Commissioner of Patents and Trademarks*